United States Patent

Huyck

[15] 3,648,727

[45] Mar. 14, 1972

[54] GAS PRESSURE REGULATOR

[72] Inventor: Robert T. Huyck, Kenmore, N.Y.

[73] Assignee: Roberts-Gordon Appliance Corporation, Buffalo, N.Y.

[22] Filed: May 7, 1970

[21] Appl. No.: 35,528

[52] U.S. Cl....................137/505, 137/505.36, 137/513.7, 137/514
[51] Int. Cl....................................F16k 31/145
[58] Field of Search............137/505, 505.36, 513.3, 513.7, 137/514; 431/38, 18

[56] References Cited

UNITED STATES PATENTS

| | | | |
|---|---|---|---|
| 2,871,879 | 2/1959 | Downe | 137/513.7 |
| 3,012,573 | 12/1961 | Peterson | 137/505 |
| 3,053,315 | 9/1962 | Deady | 137/513.7 X |
| 2,558,687 | 6/1951 | Krueger | 137/513.7 UX |
| 2,841,174 | 7/1958 | Frye | 137/469 X |
| 2,668,396 | 2/1954 | Kern | 137/505.36 |

Primary Examiner—Harold W. Weakley
Attorney—Sommer, Weber & Gastel

[57] ABSTRACT

This discloses a gas pressure regulator having additions to enable the same to apply to a burner a combustible mixture at various rates of flow to substantially reduce the tendency to flare and to flash back in a mixing tube.

9 Claims, 2 Drawing Figures

PATENTED MAR 14 1972
3,648,727
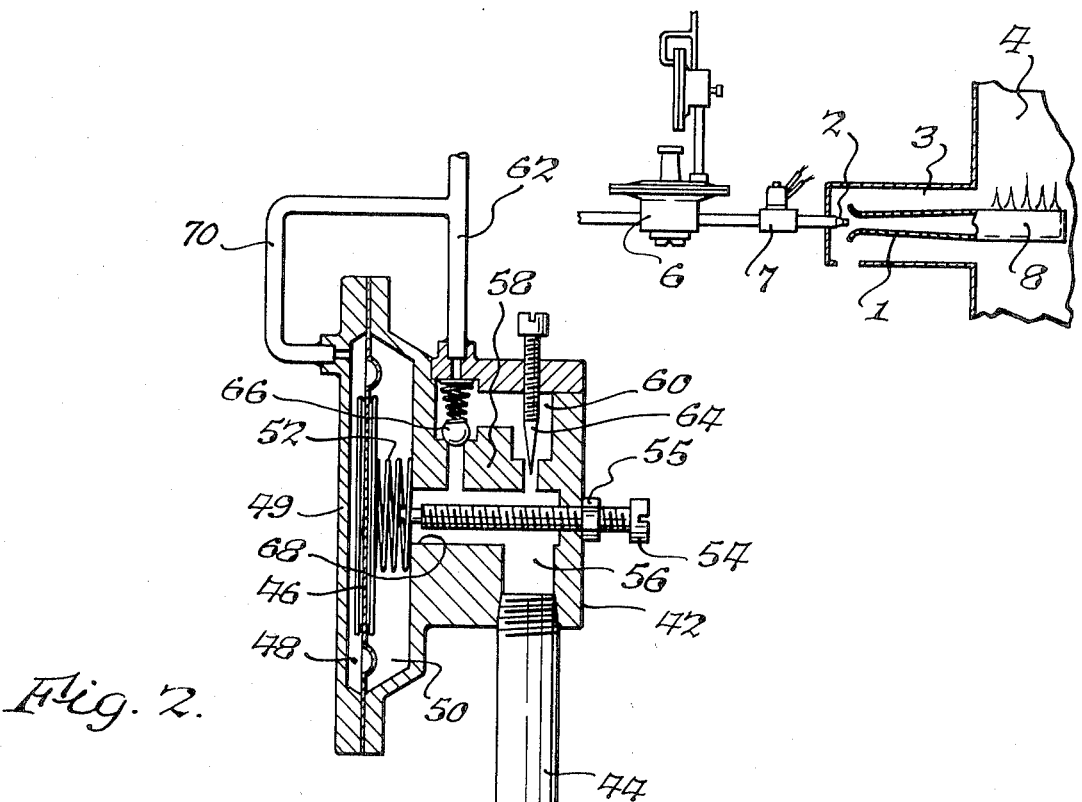
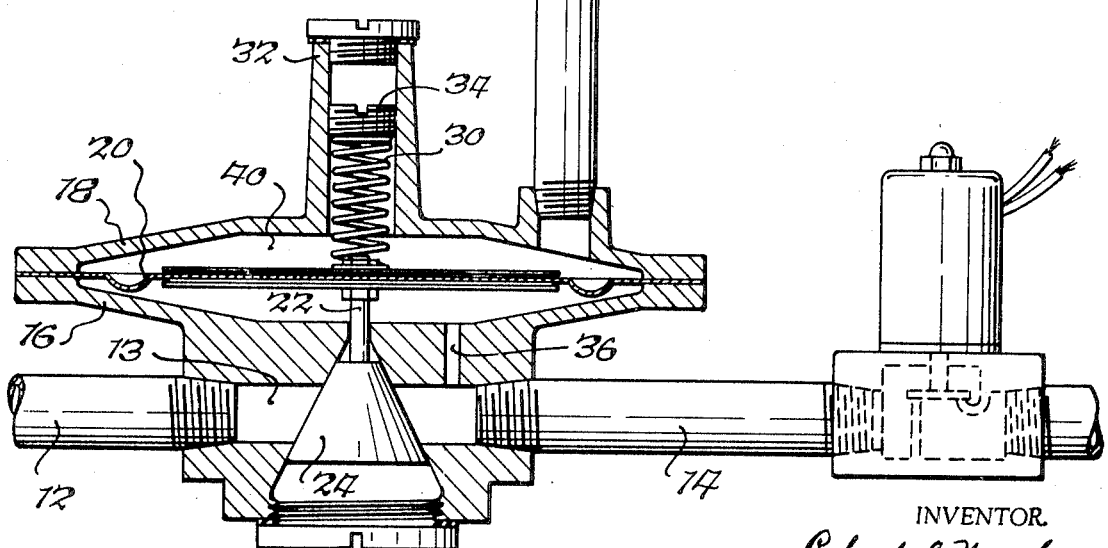
INVENTOR.
Robert J. Huyck
BY
Parker + Brshnow
ATTORNEYS.

GAS PRESSURE REGULATOR

One of the objects of this invention is to provide a gas pressure regulator which includes a control valve which is regulated in two stages; the first being a quick opening from closed to half open, and the second stage which follows immediately being a gradual opening from half to full open.

Another object is to provide a gas pressure regulator operating so that the control valve can be opened quickly to provide gas flow sufficient to exceed the velocity of flame propagation in the mixing tube and thereby prevent flash-back in the mixing tube.

Another object is to provide the gas burner regulator with means for operating to the desired flow to prevent rapid rise of pressure in the combustion chamber which might cause flaring.

Another object is to provide the gas pressure regulator which quickly closes the supply valve so that the burner can again be rapidly started without malfunction.

In the accompanying drawing:

FIG. 1 is a diagrammatic view showing a gas pressure regulator arranged in operative relation to a gas burner feeding a furnace FIG. 2 is a sectional view of a gas burner regulator embodying my invention.

An atmospheric gas burner as commonly used for house heating comprises a primary mixing tube 1 in which approximately half of the air required for combustion is mixed with the fuel gas, a gas orifice 2 at the inlet end of the mixing tube, a secondary air passage 3 which conducts the remainder of the combustion air to the combustion zone 4 of a heat exchanger, and a control system consisting of a gas pressure regulator 6 and an automatic electric gas valve 7 which delivers fuel gas to the orifice during a firing period. The primary gas air mixture is ignited at the discharge end 8 of a mixing tube, usually by means of a small pilot flame, not shown.

The heat exchanger is generally a drum-like structure which contains the flame and which incorporates passageways to conduct the spent products of combustion to the chimney. In the interest of economy of space and material, the heat exchanger is usually constructed of minimum, practicable size.

Other types of furnaces or heat exchangers may be used with burners of the type herein described and to which my improved gas burner regulators are applied. This gas regulator is of a type heretofore employed and has a gas passage 13 connected with an inlet gas pipe 12 and a discharge gas pipe 14.

This gas burner regulator comprises a housing consisting of two dished or concave members 16 and 18 with their concavities facing each other. A diaphragm 20 separates the spaces in the housing between the two members into two chambers or compartments, the lower chamber being connected with the gas pipe and the upper chamber being subjected to atmospheric pressure. The diaphragm 20 is connected by a rod 22 with a gas control or supply valve 24 which in the construction shown is of frustoconical form and cooperates with a seat in the passage 13 in the housing of the pressure control device. A spring 30 exerts pressure downwardly on the diaphragm 20 and is arranged in a screw threaded, tubular extension 32 containing an adjustable screw 34 for regulating the pressure to be applied to the diaphragm 20. The lower housing member 16 has an aperture 36 connecting with the gas passage 13 in the gas pressure regulator.

In gas pressure regulators as heretofore constructed there was also provided in the upper housing member 18 an aperture leading to the outside air. I have found however that subjecting the upper chamber and the diaphragm 20 to air pressure in this manner does not produce satisfactory operation in the starting of the burner, and consequently I have provided an air control mechanism for the upper chamber 40 in the housing member 18 which subjects the upper chamber 40 to the desired air pressure to produce variations in air pressure and consequently in gas pressure, which is suitable for the starting and operation of a burner. For this purpose I have provided a two stage air control device or mechanism provided in a housing member 42 which is connected with the upper chamber 40 in any suitable manner, for example, by means of an air tube 44 connecting the chamber 40 with the housing 42 containing the air control devices. This mechanism includes another diaphragm 46 which is arranged between two chambers 48 and 50 in the housing 42. This diaphragm which is subject to the atmospheric pressure in chamber 48, and is movable into chamber 50, operates against a spring 52 arranged in the chamber 50, which is a variable volume air supply cavity, and the movement of this diaphragm into the chamber 50 is limited by a stop screw 54 which has a screw threaded connection with a wall of the housing 42 and may be adjusted as desired to limit the movement of the diaphragm 46. The lock nut 55 serves to secure the adjusting screw in a set position. Such diaphragm 46, stop screw 54, nut 55 and spring 52 constitute the first stage of the air control divide, which first stage is operatively associated with chamber 50 for rapidly transmitting an initial volume of air in such chamber to air compartment 40, with the stop screw controlling the amount of the initial volume of air so transmitted. Such initial volume is sufficient to produce a relatively fast partial opening of valve 24 but is insufficient to produce full opening thereof.

In the housing 42 is a chamber 56 through which stop screw 54 projects and in which the air tube 44 terminates, and this chamber has a transverse wall or partition 58 which forms another chamber 60 connected to the outside air by means of a tube 62. The chambers 56 and 60 are connected to each other by two passages through partition 58, one controlled by means of a needle valve 64 and the other passage being controlled by means of a normally closed, spring pressed check valve 66 which otherwise disconnects these chambers but upon opening admits air only from the chamber 56 to the chamber 60. Needle valve 64 and its passage constitute the second stage of the air control device, which second stage is connected to air compartment 40 regardless of the condition of the first stage, for gradually admitting a secondary volume of air from the atmosphere to the air compartment. This secondary volume is sufficient to produce a relatively slow full opening of valve 24 following partial opening thereof by the first stage.

When the burner is to be started, a flow of air is admitted to the chamber 40 to such an extent that the flow of combustible mixture in the burner should be approximately one-half of that which normally is fed to the burner after the same has been started. This control of combustible mixture is made possible by letting air flow through the tube 44 from the chambers 56 and 50 which are connected with each other through the opening 68 about which the spring 52 extends. These two chambers 56 and 50 are so designed that when the air in them is withdrawn to the tube 44 by the downward movement of the diaphragm 20, the control valve 24 is quickly opened to such an extent that the mixture of air and gas through the burner to the combustion chamber moves at approximately one-half of the speed at which air and gas move when the burner is in full operation. This provides in the combustion chamber a combustible mixture which is ignited by means of a pilot flame or other means, not shown, so that the burning mixture will produce a pressure in the combustion chamber which is sufficient to start the movement of burnt gas out of the combustion chamber into a chimney or flue without building up sufficient pressure in the combustion chamber to cause reverse flow in the burner.

The above first stage of opening of control valve 24 to permit approximately one half of ultimate gas flow is followed immediately by a second stage of opening of the control valve which is gradual, over a period typically 5 to 30 seconds, at the end of which the regulator valve is fully open to normal operating position. The time rate of opening in this second stage is controlled by the needle valve 64 as a result of the following conditions.

The withdrawal of air from chamber 50 in the first stage of opening tends to create a vacuum or subatmospheric pressure in chamber 50. Atmospheric pressure in chamber 48 then acts as a force against diaphragm 46, moving it against the force of spring 52 until stop 54 is engaged. The initial volume of air removed from chamber 50 can move freely and unrestrictedly toward chamber 40. Once diaphragm 46 is against stop 54, however, no more air is available from chamber 50.

Since the regulator valve 24 is only partially open, the pressure of spring 30 is greater than the pressure of gas on the lower surface of diaphragm 20. The spring thus causes a downward movement of diaphragm 20, thus tending to create a vacuum in chamber 40. This vacuum also exists in passage 44 and chambers 50 and 56. With subatmospheric pressure in chamber 56 and atmospheric pressure in chamber 60, air will move from 60 to 56 through the restriction caused by needle valve 64, to nullify the vacuum. The rate at which the secondary volume of air is allowed through the restriction determines the rate at which diaphragm 20 can move down, and consequently the rate at which valve 24 opens fully to normal operating position.

The rate of operation of the air control device in the housing 42 may of course be adjusted by means of the adjusting of the needle valve 64 and the stop screw 54.

In the operation of the air control mechanism in the housing 42 the rear wall 49 is not necessary and may be entirely omitted. On the other hand a branch air pipe 70 may be desirable as a safety precaution in case a leak of gas occurs through the diaphragms 20 and 46.

When the gas pressure regulator has reached normal operating equilibrium downward movement of the diaphragm 20 will cease and chambers 60, 50, 56 and 40 will all attain atmospheric pressure. With atmospheric pressure on each side, diaphragm 46 will be moved by spring 52 to its normal position. This action resets the air control to normal position in which the burner can be again readily started if for any reason a quick operation of the burner is required after it has been extinguished.

Since changes in inlet pressure are corrected by changes in position of diaphragm 20 and resultant changes in degree of throttling of valve 24 the resulting flow of air into or out of chamber 40 is normally through the restriction controlled by the needle valve 64. This impedance to flow is beneficial in that it smooths out any tendency of the regulator to "hunt" when normal changes in inlet pressure occur. The construction shown will also accommodate abrupt changes in pressure which are of greater than normal magnitude, as follows:

a. Should a sudden abnormally large increase in gas pressure occur, check valve 66 will open, releasing a reverse flow of air to the atmosphere and bypassing needle valve 64, thereby rapidly dissipating the pressure rise in cavities 40 and 50 and their connecting passageways to produce a relatively fast closing of valve 24.

b. Should there be a sudden decrease in gas pressure, the function of the device will be similar to a new start. The system can thus utilize transfer of air from cavity to cavity to quickly restore pressure regulation by bypassing the slowing effect of restriction by the needle valve.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A pressure control device for use with a gas burner including: a gas pressure regulator having a housing divided into a gas compartment and an air compartment by a diaphragm, a gas conduit leading to said burner, a gas control valve in said conduit connected with said diaphragm and movable into flow controlling positions by said diaphragm, and a vent in said air compartment of said regulator, wherein the improvement comprises: a two stage air control device connected with said vent and including a variable volume air supply cavity connected to said air compartment, first stage means operatively associated with said cavity for rapidly transmitting an initial volume of air in said cavity to said air compartment, said initial volume of air being sufficient to produce a relatively fast partial opening of said gas control valve but insufficient to produce full opening of said gas control valve, and second stage means connected to said air compartment regardless of the condition of said first stage means for gradually admitting a secondary volume of air from the atmosphere to said air compartment, said secondary volume of air being sufficient to produce a relatively slow full opening of said gas control valve following said partial opening thereof.

2. The pressure control device of claim 1 wherein said first stage means include means subject to atmospheric pressure and movable into said cavity, and adjustable means for limiting the movement of said movable means into said cavity to control the amount of said initial volume of air transmitted from said cavity to said air compartment.

3. The pressure control device of claim 1, wherein said second stage means include restriction means connecting said air compartment with the atmosphere to control the rate of admission of said secondary volume of air from the atmosphere to said air compartment.

4. The pressure control device of claim 3 wherein said first stage means include means subject to atmospheric pressure and movable into said cavity, and adjustable means for limiting the movement of said movable means into said cavity to control the amount of said initial volume of air transmitted from said cavity to said air compartment.

5. The pressure control device of claim 4 wherein said air control device includes normally closed valve means otherwise disconnecting said air compartment from the atmosphere but upon opening releasing a reverse flow of air from said air compartment to the atmosphere and by-passing said restriction means to produce a relatively fast closing of said gas control valve.

6. The pressure control device of claim 1 wherein said first stage means include an auxiliary diaphragm subject to atmospheric pressure and movable into said cavity, and an adjustable stop screw for limiting the movement of said auxiliary diaphragm into said cavity to control the amount of said initial volume of air transmitted from said cavity to said air compartment.

7. The pressure control device of claim 1 wherein said air control device includes a chamber connected to said cavity and air compartment, and said second stage means include a needle valve connecting said chamber with the atmosphere to control the rate of admission of said secondary volume of air from the atmosphere to said air compartment through said chamber.

8. The pressure control device of claim 7 wherein said first stage means include an auxiliary diaphragm subject to atmospheric pressure and movable into said cavity, and an adjustable stop screw extending through said chamber for limiting the movement of said auxiliary diaphragm into said cavity to control the amount of said initial volume of air transmitted from said cavity to said air compartment through said chamber.

9. The pressure control device of claim 8 wherein said air control device includes a normally closed check valve otherwise disconnecting said chamber from the atmosphere but upon opening releasing a reverse flow of air from said air compartment to the atmosphere through said chamber and by-passing said needle valve to produce a relatively fast closing of said gas control valve.

* * * * *